United States Patent Office 3,005,798
Patented Oct. 24, 1961

3,005,798
COLOR IMPROVEMENT IN PHENOL-
FORMALDEHYDE RESINS
David A. Feigley, Jr., Manor Township, Lancaster
County, Pa., assignor to Armstrong Cork Company,
Lancaster, Pa., a corporation of Pennsylvania
No Drawing. Filed Sept. 8, 1958, Ser. No. 759,414
5 Claims. (Cl. 260—59)

This invention relates generally to phenolic resins, and more particularly to phenol-formaldehyde resins. Still more particularly, the invention relates to a method of improving the color of cured phenolformaldehyde resinous compositions. It also relates to the phenol formaldehyde compositions having improved color in the cured state.

Most inexpensive commercial phenolic casting resins and molding resins develop a red-to-black color on cure. This color is objectionable since it can only be masked with dark pigments.

It is possible to prepare phenolic resins which on cure will not develop the objectionable color described above. By the use of special equipment, pure raw materials, and careful process control, a phenol-formaldehyde curable composition can be prepared which will not develop the objectionable dark color on cure. Such resins are more costly than the usual commercial grades of resin, however. As a general rule, the lighter the color of the curable composition, the more costly is its manufacture. Thus, there is a definite need for an inexpensive and simple method of eliminating or minimizing the objectionable dark color that results from the curing of the usual commercial phenol-formaldehyde resins.

It is the primary object of the present invention to supply such a method. It is a further object of the present invention to supply an agent which will eliminate or minimize the objectionable dark color in cured commercial phenol-formaldehyde resins in the form of film, cast, and molded products. It is also an object to supply an inexpensive commercial phenolaldehyde composition which will cure to a light-colored product.

These objects are accomplished in a surprisingly effective and straightforward manner. The invention contemplates incorporating glyoxal into a curable phenol-formaldehyde composition. The amount to be used will be sufficient to improve the color of the phenol-formaldehyde composition and will always be in the range of about 0.2%–1% by weight of the glyoxal based on the weight of the total phenol-formaldehyde solids. The resulting mixture may then be cured and otherwise handled in the usual manner.

The phenol-formaldehyde resins useful in the present invention are known items of commerce. They are prepared by the reaction of phenolic materials with formaldehyde in the presence of either an acid or an alkaline catalyst, the type of catalyst used depending upon the product desired. The phenol used in the preparation of the phenol-formaldehyde resins may be any of the nuclear hydroxy-substituted aromatic hydrocarbons containing carbon, hydrogen, and oxygen, and possibly other constituents, and includes phenol itself, cresol, xylenol, resorcinol, as well as the mixture of phenols known to the trade as cresylic acid. The aldehyde to be used must always be formaldehyde.

Molding phenolics are usually prepared either by a one-stage or two-stage process. In the one-stage process, about 1.2 moles of formaldehyde is reacted with one mole of phenol in the presence of an alkaline or an acid catalyst by heating in a steam packeted kettle. The most common catalysts are ammonia and potassium or sodium hydroxide, although amines, alkali carbonates, may be used. The alkaline-catalyzed product is more common than the acid-catalyzed product. The time of reaction is dependent upon the type and amount of catalyst, proportion of formaldehyde, and temperature, and must be controlled to secure uniformity of the product. After the reaction has progressed to the desired extent, water may be removed under vacuum and the resin discharged from the reaction vessel.

In the more common two-stage process, a fusible soluble resin is first formed by the reaction of formaldehyde and phenol in a manner similar to the one-stage process. The proportion of formaldehyde used is less than that required to produce an infusible resin, hence, the control of the reaction is much less critical. Acid catalysts are often used in this process and are subsequently neutralized. Ammonia and alkali catalyst may also be used, however. After dehydration or removal of some of the water, the treatment is similar to the one-stage process except that formaldehyde sufficient to cure the resin may be added along the fillers, pigments, and lubricants. The formaldehyde may be added in the form of hexymethylene tetramine or paraformaldehyde.

Casting resins are generally prepared by reacting 1.5–2.5 moles formaldehyde per mole of phenol with an alkaline catalyst in a reaction vessel at 70°–100° C. The time of reaction is dependent upon the conditions used, varying from about 15 minutes to about 3 hours. Viscosity measurements are often used as a control for the reaction. Water is removed under vacuum, leaving a viscous resin after neutralizing the catalyst with organic acids. The color may be water-white to deep red, depending on the character of the reaction vessel, the purity of the ingredients, and the care with which the reaction is run. Generally speaking, the whiter resins are more expensive than the darker.

Molding resins may be mixed on heated rolls at 200°–225° F. with fillers, pigments, and mold lubricants. Such treatment serves to bring about further condensation of the resin to a very viscous but still fusible state, and it is continued until the desired degree of plasticity is attained. The resin is then cooled in sheet form and ground. It may then be sieved to uniform particle size. The molding powder is then used in ways well-known in the art.

Casting resins remain in the form of a liquid to which may be added plasticizers, glycerin to stabilize the moisture content, and mold lubricants, along with dyes and pigments. The resin may be poured into the preheated molds and converted to a solid by a slow cure below about 85° C. for a period of time of about three to ten days.

The phenol-formaldehyde resins contemplated for use in the present invention are any of those resins prepared along the lines described above which develop the usual, objectionable dark color on cure. Fillers, dyes, pigments, reinforcing agents, lubricants, and the like may be used in the normal manner.

The amount of glyoxal to be added to the phenol-formaldehyde composition is critical within the range of about 0.2%–1% by weight of the aldehyde based on the weight of the total phenol-formaldehyde solids. It has been found that amounts of the aldehyde less than about 0.2% by weight based on the weight of resin solids do not give practical color elimination. Amounts of the aldehyde above about 1% by weight bring about changes in the normal physical properties of the cured phenol - formaldehyde resins. Additionally, higher amounts of the aldehyde may result in some free aldehyde remaining in the cured phenol-formaldehyde composition, which residues may be undesirable for many applications.

It is preferred that the glyoxal be incorporated into the phenolic resin while the latter is in water-soluble form. This aids in the dispersion of the glyoxal throughout the resinous mass. Where the phenol-formaldehyde resin is prepared under alkaline conditions, the glyoxal may be introduced directly into the reaction vessel along with the phenol and the formaldehyde reactants. When this method of addition is used, smaller amounts of the glyoxal may be added since the color-eliminating mechanism appears to operate more efficiently. Thus, the requisite glyoxal will be present in the resinous mixture from the very beginning, and the resin may henceforth be handled in the normal manner. If the phenol-formaldehyde reaction is carried out under acid conditions, it is preferred that the glyoxal be withheld until the acid catalyst is neutralized, after which the glyoxal may be added as desired. The glyoxal may be added as such or in the form of a water solution. Where the resin is to be handled as an anhydrous mass, it is preferred that the glyoxal be introduced prior to the removal of the water. Where the resin is to be handled as an aqueous solution or suspension, the aldehyde may be introduced into the solution at any time and in any convenient manner prior to cure.

A cure of the composition of the present invention will generally produce a yellow, straw-colored, clear, transparent solid in the absence of fillers, reinforcing agents, and pigments. The color is such that it may readily be pigmented even with light pastels.

The following examples illustrate several embodiments of the invention. All parts are by weight unless otherwise stated.

*Example 1*

An aqueous, dark red solution containing 71.8% solids of a phenol-formaldehyde resin in the resole stage, having a pH of 7.7 and a viscosity of about 130 centipoises at 25° C. (Durez 16056), was poured into a Petri dish and placed overnight in an oven maintained at 195° F.

The resulting cured film was opaque and of blackish-red color.

*Example 2*

To 20 parts of the resin solution of Example 1 was added 0.5 part glyoxal and the mixture was stirred to dissolve the aldehyde. No lightening of the deep red color of the resole was noted.

On curing overnight in a Petri dish at 195° F., a clear, transparent, pale, straw-yellow film of cured phenolic resin resulted.

When the experiment was repeated using 0.25 part of the glyoxal, there was obtained again the clear, transparent, straw-yellow film of cured phenolic resin.

*Example 3*

Example 2 was repeated save that in place of the 0.5 part glyoxal, individual runs were made each containing one part of the following compounds respectively:

Acrolein, formalin (40% solution), paraformaldehyde, and glutaraldehyde.

On curing each of these compositions as in Example 2, a film resulted which was indistinguishable from that obtained in Example 1; that is, the film was of a deep, blackish-red color.

*Example 4*

Example 2 was repeated using a red monomeric resole, water-soluble, alkaline-catalyzed, thermosetting A-stage phenol-formaldehyde resin (Varcum 3754). On the addition of 0.3 part glyoxal, a clear, transparent, light yellow film resulted.

*Example 5*

Into a round-bottom flask was placed 90 parts (1.1 mole) commercial phenol, 112.5 parts (1.5 moles) formaldehyde as a 40% solution in water, 0.041 part $BaOH \cdot 8H_2O$, and 0.64 part NaOH. The flask was placed in a boiling water-bath. In 30 minutes the temperature of the mixture reached 205°–210° F. The mixture was maintained at that temperature range for an additional two hours, and then removed from the bath.

A portion of the resulting reddish mixture was poured into a Petri dish and cured overnight at 195° F. The resulting film was hard, tough, and smooth, and was a dark red-to-black color.

When the resin preparation was repeated save that 0.5 part glyoxal was added to the mixture prior to heating the mixture on the water-bath, the resulting cured film was of a light, clear, straw-yellow color.

I claim:

1. The method of improving color of cured phenolic resins while preserving the normal properties of such resins which comprises curing a curable thermosetting phenol-formaldehyde composition which has been made with a molar excess of formaldehyde and improving the color of said composition by adding glyoxal in an amount in the range of about 0.2%–1% by weight based on the weight of the total phenol-formaldehyde solids to said curable composition.

2. The method according to claim 1 wherein said glyoxal is used in an amount of about 0.3% by weight.

3. A composition of matter capable of curing to a light-colored product consisting essentially of a thermosetting phenol-formaldehyde resin made with a molar excess of formaldehyde, and sufficient glyoxal to improve the color of said resin in the range of about 0.2%–1% by weight based on the weight of the total phenol-formaldehyde solids in the composition.

4. A cured composition of matter made by the method of claim 1.

5. A cured composition of matter made by the method of claim 2.

References Cited in the file of this patent

UNITED STATES PATENTS 2,621,165    Brown _____ Dec. 9, 1952

UNITED STATES PATENT OFFICE
CERTIFICATION OF CORRECTION

Patent No. 3,005,798                      October 24, 1961

David A. Feigley, Jr.

It is hereby certified that error appears in the above numbered patent requiring correction and that the said Letters Patent should read as corrected below.

Column 1, line 69, for "packeted" read -- jacketed --; column 2, line 15, for "catalyst" read -- catalysts --; column 4, lines 12 and 13 for "(1.1 mole)" read -- (1.0 mole) --.

Signed and sealed this 3rd day of April 1962.

(SEAL)
Attest:

ERNEST W. SWIDER                      DAVID L. LADD
Attesting Officer                      Commissioner of Patents